United States Patent
Doublet

(10) Patent No.: US 7,128,272 B2
(45) Date of Patent: Oct. 31, 2006

(54) METHOD FOR MAKING AN ARTICLE COMPRISING A SHEET AND AT LEAST AN ELEMENT DIRECTLY MOUNTED THEREON

(75) Inventor: Pierre Doublet, Saint-Brice (FR)

(73) Assignee: Arjo Wiggins Security SAS, Issy les Moulineaux (FR)

( * ) Notice: Subject to any disclaimer, the term of this patent is extended or adjusted under 35 U.S.C. 154(b) by 0 days.

(21) Appl. No.: 10/466,108

(22) PCT Filed: Nov. 20, 2002

(86) PCT No.: PCT/FR02/03962

§ 371 (c)(1),
(2), (4) Date: Dec. 3, 2003

(87) PCT Pub. No.: WO03/055683

PCT Pub. Date: Jul. 10, 2003

(65) Prior Publication Data

US 2004/0065743 A1 Apr. 8, 2004

(30) Foreign Application Priority Data

Nov. 20, 2001 (FR) .................................. 01 14986

(51) Int. Cl.
*G06K 19/06* (2006.01)
*G06K 19/02* (2006.01)

(52) U.S. Cl. ...................................... 235/492; 235/488
(58) Field of Classification Search ................ 235/492, 235/488, 441, 486, 487, 491
See application file for complete search history.

(56) References Cited

U.S. PATENT DOCUMENTS

| 4,889,366 A | 12/1989 | Fabbiani |
| 5,637,858 A | 6/1997 | Hoppe et al. |
| 5,944,927 A | 8/1999 | Seifert |
| 6,060,428 A | 5/2000 | Chang et al. |
| 6,305,609 B1 | 10/2001 | Melzer et al. |

FOREIGN PATENT DOCUMENTS

FR 2 757 313 6/1998

*Primary Examiner*—Thien M. Le
(74) *Attorney, Agent, or Firm*—Westerman, Hattori, Daniels & Adrian, LLP

(57) ABSTRACT

The present invention relates to a process for manufacturing an article (1) comprising a sheet (2) and at least one element (4) having a certain thickness, comprising the following steps:
  providing a sheet (2) with at least one cavity (3) open on one side;
  placing said element in this cavity (3) by applying, to said side, a structure (5) comprising at least one layer carrying the element, said structure being positioned with respect to the sheet (2) so that the element (4) is at least partly housed in the cavity (3).

40 Claims, 5 Drawing Sheets

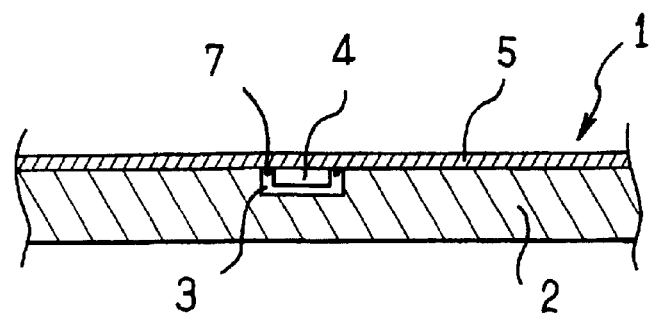
FIG_1
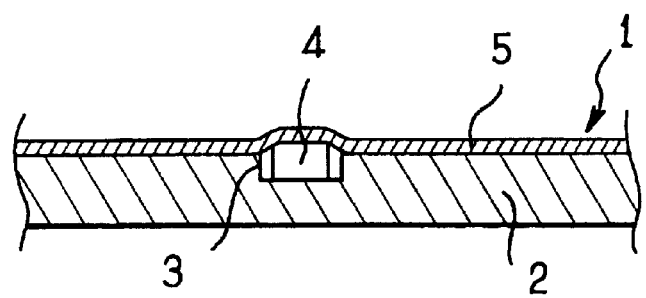
FIG_2
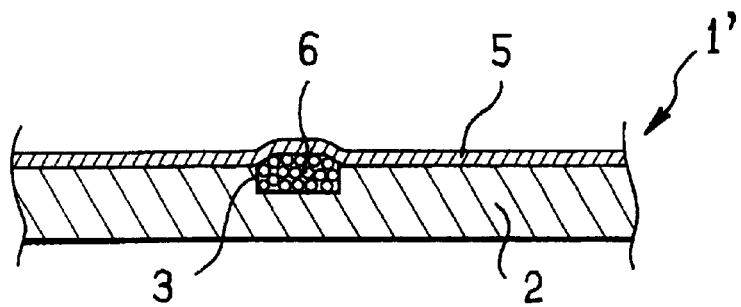
FIG_3

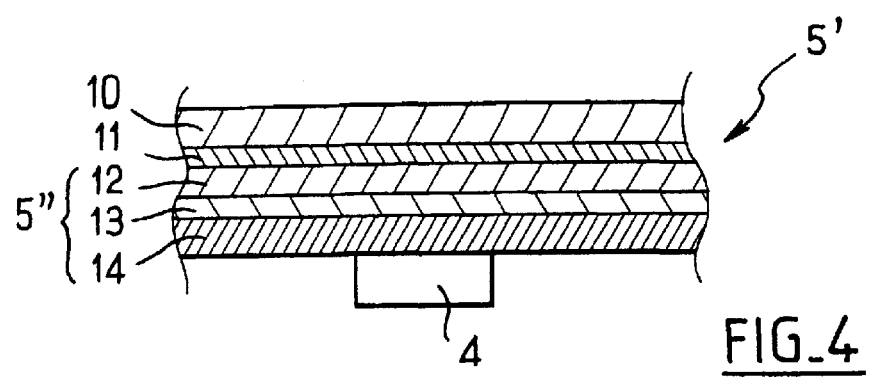
FIG_4
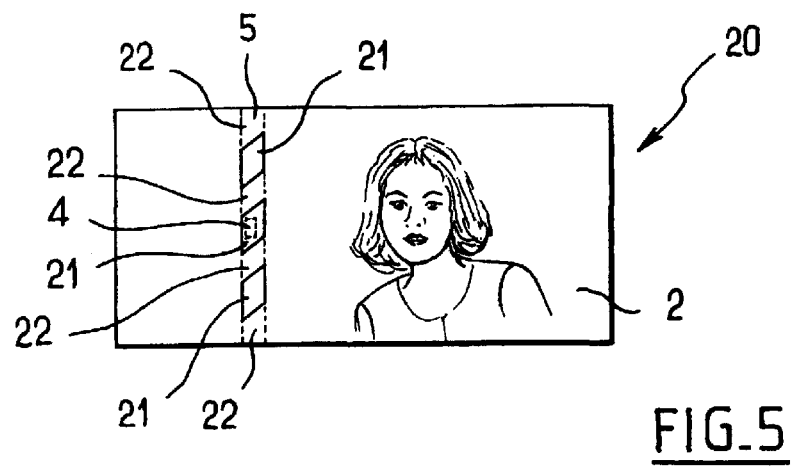
FIG_5
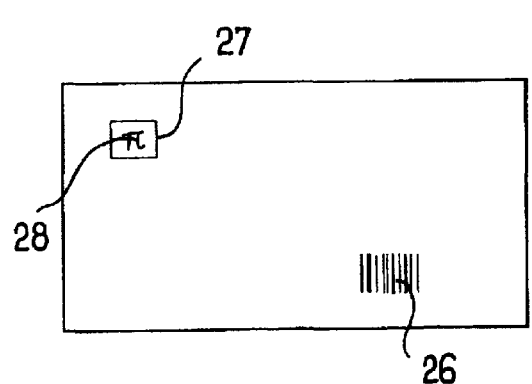
FIG_6
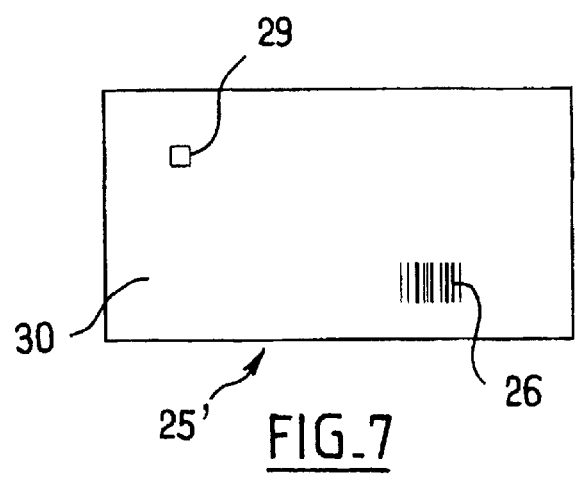
FIG_7

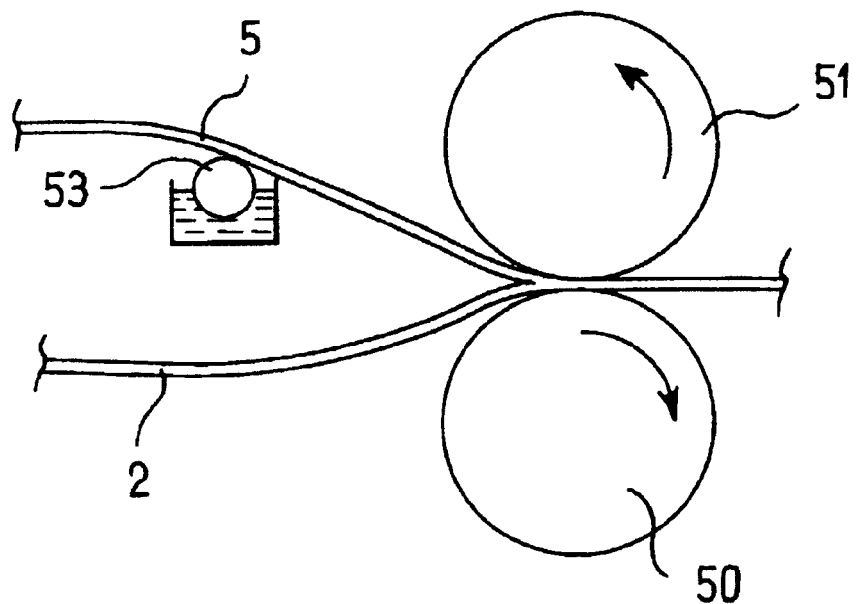
FIG_11
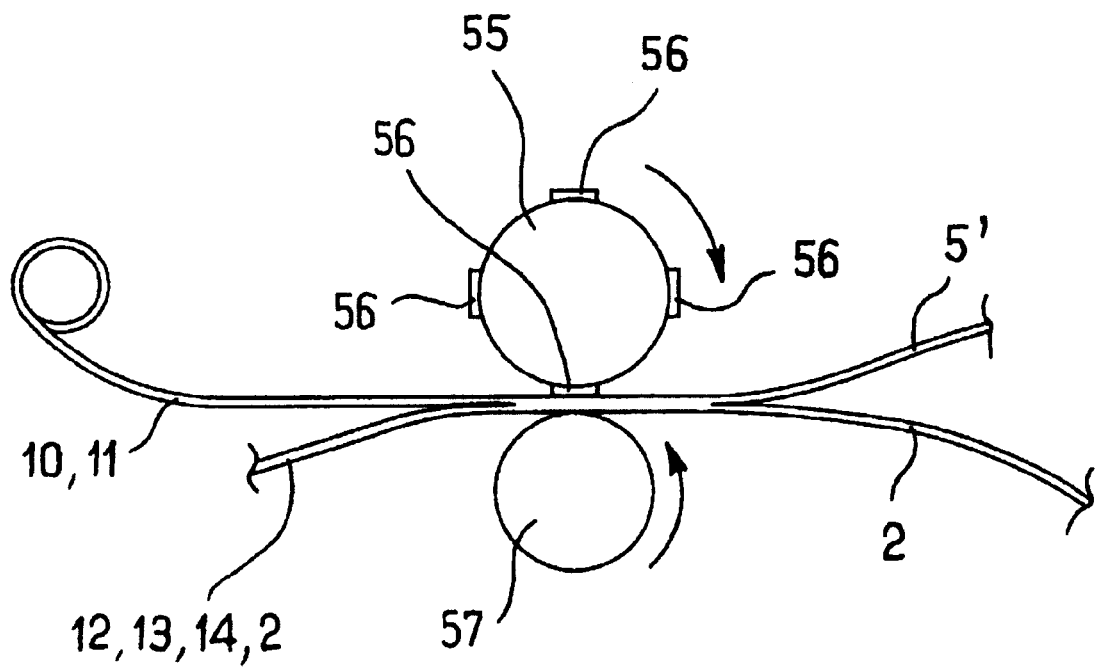
FIG_12

METHOD FOR MAKING AN ARTICLE COMPRISING A SHEET AND AT LEAST AN ELEMENT DIRECTLY MOUNTED THEREON

The subject of the present invention is especially a process for manufacturing an article comprising a sheet and a security element introduced into the sheet.

The invention relates more particularly, but not exclusively, to the incorporation of an element, such as an electronic chip, into an article, for example a security document.

Many examples of structures that include an electronic chip may be mentioned.

International application WO 99/54842 discloses a paper banknote provided with a security thread that includes an electronic chip made of a semiconducting organic polymer.

German patent application DE 198 33 746 discloses a traveler's check obtained by placing a band of polymer material that includes an electronic chip on a first layer of paper and attaching to this first layer a second layer of paper, so that the band of polymer is sandwiched between the two layers.

German patent application DE 196 01 358 discloses a paper article that includes, embedded in its thickness, a micromodule consisting of an integrated circuit and a metal film.

German patent application DE 196 30 648 discloses a banknote that includes an interrupted security band and an electronic chip placed between two portions of this band.

Also known, from international application WO 00/26856, is a label that includes an electronic chip housed in a hole in a flexible substrate. The chip is held in this hole by means of an epoxy resin.

The aim of the present invention is in particular to provide a novel process for manufacturing an article comprising a sheet and at least one attached element, such as an electronic chip for example.

Thus, the subject of the invention is a process for manufacturing an article comprising a sheet and at least one element having a certain thickness, this process being characterized in that it comprises the following steps:

providing a sheet with at least one cavity open on one side;

placing said element in this cavity by applying, to said side, a structure comprising at least one layer carrying the element, said structure being positioned with respect to the sheet so that the element is at least partly housed in the cavity.

The structure, apart from the fact that it can cover the cavity, may define a visible surface of the article, this surface possibly constituting a security device for example.

The layer carrying the element may be made of plastic or metal. It may be formed from a thin plastic film or a metal film or coating, for example.

The layer carrying the element may also provide for the application of a film-forming composition, especially a magnetic or iridescent film-forming composition.

The layer carrying the element may also be based on fibrous material.

In a preferred method of implementing the invention, the sheet and the element are joined together by hot or cold transfer. For example, the element carried by the structure may be transferred onto the sheet in the following manner:

the running sheet is pressed against a die carried by a rotating roll, the die being moved in synchronism with the sheet;

the structure is brought between said die and the sheet so that the structure comes into contact with the sheet and the element is transferred into the cavity of the sheet; and optionally, after the element has been transferred to the sheet, one or more layers of the structure are removed.

For example, after transfer, it is possible for only the element and an adhesive layer of the structure to be retained, it being possible for said adhesive layer to help to fasten the element in the cavity of the sheet.

In one particular method of implementation, the structure is brought up against the sheet in a direction generally transverse to the direction in which the sheet runs.

In another example of a method of implementing the invention, the sheet and the structure are joined together by adhesive bonding.

A registration means may be used in order to allow precise placing of the element in the cavity of the sheet.

Such a registration means may comprise printing or a watermark on the sheet.

When the sheet and the structure have been joined together by adhesive bonding, the layer of the structure carrying the element may be based on a material other than a fibrous material, for example a plastic, the structure possibly containing no fibrous material at all.

When the sheet and the structure are joined together by adhesive bonding and the layer of the structure carrying the element is based on a fibrous material, the article may consist, for example, of an article other than a passport, an identity card, a family record book or a savings passbook.

In one example of a method of implementing the invention, the depth of the cavity is greater than or equal to the thickness of the element.

Thus, there is no increase in thickness of the article at the point where the element is. The element, for example an electronic chip, may thus be made difficult to detect visually and by feel.

In addition, when the depth of the cavity is chosen so that the element is housed in the cavity without projecting therefrom, the element is protected from any pressure exerted during the manufacture of the article or during its use.

The cavity may or may not be a through-cavity.

The sheet may be made in a material chosen so as to have resilience properties sufficient to protect the element housed in the cavity from mechanical stresses such as shocks or pressure exerted by a printing machine.

The structure may or may not cover all of one side of the sheet. The structure may, for example, be in the form of a band not covering all of one side of the sheet. This band may extend without a break between two opposed edges of the article. The structure may also not extend without a break between opposed edges of the article and may thus form a patch.

The article may include, in line with the element, a relief that can be detected by feel or an area of hardness or softness that can be detected by feel, so as, for example, to allow an unsighted person to recognize the article.

The structure may be transparent or opaque, partially metalized or have a layer of metal completely covering one of its sides.

The structure may also include a holographic and/or diffractive element. The structure may also include a magnetic, metallic or crystalline coating or else iridescent, thermochromic and/or piezochromic pigments.

In one particular embodiment, the structure includes liquid crystals.

The structure may also receive at least one printing element, for example a varnish or ink printing element.

In one particular embodiment, the structure includes at least one reflecting surface that may or may not be continuous.

The layer of the structure carrying the element may be fastened to a carrier layer, before the element is transferred to the sheet. The carrier layer may be removed after the layer carrying the element has been joined to the sheet. The layer carrying the element may thus be transferred onto the sheet. The layer carrying the element may be formed by a film, for example.

The carrier layer may optionally carry a number of film or fibrous portions placed so that, after their transfer to the sheet, these portions are spaced apart on the surface of the sheet. The article may include one or more of said portions. Each portion may carry one or more elements, these being identical or otherwise. Said portions may be separated from one another on the carrier layer, for example being uniformly spaced apart. Each portion may have a polygonal, oval, circular or other outline, and form a patch for example.

The structure may or may not be of the multilayer type. For example, it is possible for the sheet to be brought into contact with a composite structure, also called a foil, initially comprising the following layers:

a carrier layer, for example made of polyester;
a release layer, for example made of wax;
optionally, a layer of varnish containing a resin and optionally a dye;
a layer of metal, for example aluminum, of plastic or of fibrous material, or a layer deriving from the application of a film-forming composition, especially a magnetic or iridescent film-forming composition; and
an adhesive layer.

Such an adhesive layer may be used to fasten, for example, the element to the sheet.

The sheet may receive beforehand an undercoat or adhesion primer, for improving the fastening of the element to the sheet and/or the surface characteristics of the sheet.

The structure may be joined to the sheet in various ways, for example by hot pressing.

The nature of the metal layer and its surface appearance may be chosen so as to reflect light through the layer of colored varnish, as the case may be.

The structure may essentially be formed by a film, especially a metal film or a plastic film, for example, and the entire structure may be left to remain on the sheet. There may be just one such film.

The structure may also be formed by a layer coming from the application of a film-forming composition.

The structure may be formed by just one film or just one layer, made of fibrous material or otherwise.

In one particular embodiment of the invention, the element includes an electronic chip, for example allowing contactless data transmission. This chip may be connected to an antenna comprising at least one turn. The antenna may be carried by a film and extend around the chip on the film. As a variant, the antenna may be placed on the chip itself. The chip may be based on silicon.

The element may be formed by an element other than an electronic chip.

In one particular embodiment, the element is capable of retransmitting a signal when the article is placed in a predetermined electromagnetic or light field.

The element may include magnetic, metallic or plastic particles having a hardness or softness that can be detected by feel.

The element may also include crystals or biomarkers.

In one embodiment of the invention, the sheet includes at least one fibrous layer, or else just one fibrous layer. The sheet may for example include cellulose fibers and/or other natural, artificial or synthetic fibers. The sheet may also include, for example, at least one layer of plastic.

In one particular method of implementing the invention the cavity intended to house the element is cut out by means of a laser. As a variant, the cavity may be cut out by mechanical abrasion.

As another variant, the cavity is produced during formation of the sheet on the paper machine and the sheet may in particular be produced in the following manner:

a first ply of paper is formed on contact with a surface immersed in a dispersion of fibrous material, this first ply having an area of reduced thickness, or even a hole, in order to form said cavity;
the first ply of paper is joined to a second ply of paper.

The element may be placed in the cavity on a hot- or cold-transfer machine, before the article is dried on a paper machine.

As a variant, the element is transferred to the sheet on a transfer machine integrated into a printing machine.

The article obtained may have a number of cavities, each receiving one element. These cavities may receive different elements and/or elements having complementary functions.

The subject of the invention is also an article obtained by implementing the process described above.

The article may constitute, for example, a banknote, a security paper, a gift voucher, a coupon, a value document, a mark or product protection label or a traceability label, this list not being exhaustive.

The subject of the invention is also an article comprising a sheet that includes at least one fibrous layer, having at least one cavity at least partly housing an element of a certain thickness, this cavity being covered by a structure made of plastic, metal or fibrous material, or by a layer deriving from the application of a film-forming composition, especially a magnetic or iridescent film-forming composition.

Especially when the article consists of an article other than a passport, an identity card, a family record book or savings passbook, the cavity of the sheet may be covered, for example, by a layer of fibrous material.

When the cavity is a through-cavity, the sheet may be covered on both sides by a layer of fibrous material. In other words, the sheet is sandwiched between two fibrous layers.

A clearer understanding of the invention may be gained on reading the following detailed description of nonlimiting embodiments and on examining the appended drawing in which:

FIG. 1 shows schematically and partially, in cross section, an article according to a first embodiment of the invention;

FIG. 2 shows schematically and partially, in cross section, an article according to a second embodiment of the invention, including a relief that can be detected by feel;

FIG. 3 shows schematically and partially, in cross section, an article according to a third embodiment of the invention, also including a relief that can be detected by feel;

FIG. 4 is a schematic and partial cross section of a structure that can be used;

FIG. 5 shows schematically and partially a banknote according to the invention;

FIGS. 6 and 7 show schematically and partially gift vouchers according to two embodiments of the invention;

FIG. 11 illustrates schematically the lamination of a sheet and a structure;

FIG. 12 illustrates schematically, in cross section, the transfer of an element to a sheet.

Figure 8:
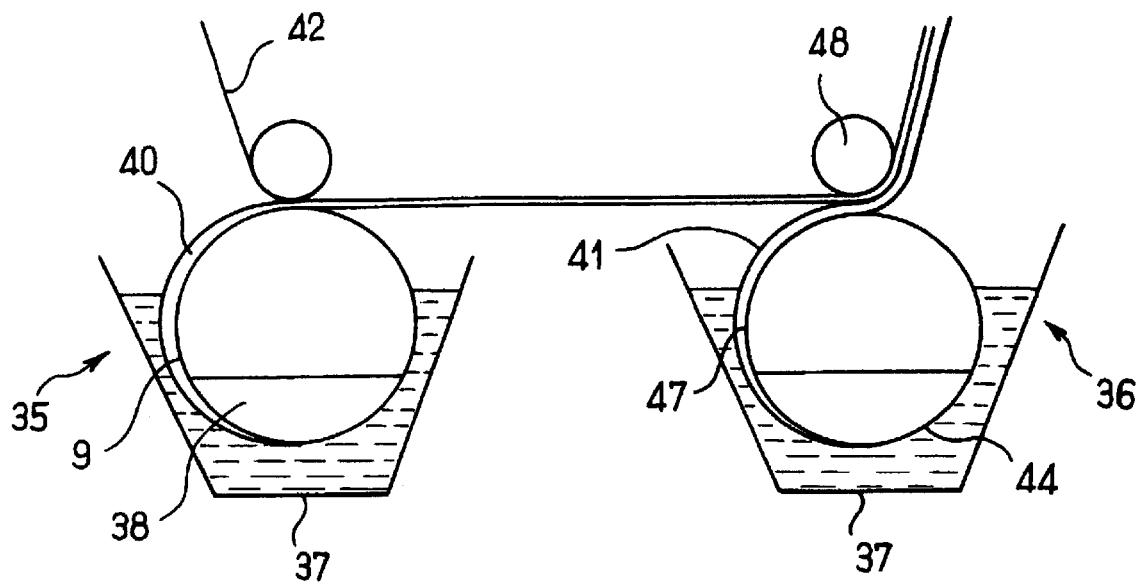
FIG. 8 shows, schematically, an example of a plant for producing a sheet with cavities that open on one side.

Throughout the description, including the claims, the expressions "comprising one" and "including one" must be understood as meaning "comprising at least one", unless otherwise specified.

FIG. 1 shows an example of an article 1 according to the invention, comprising a sheet 2 having, on one side, a non-through-cavity 3 for receiving an element, such as an electronic chip 4, fastened to a structure 5 formed by a film, for example a polyester film.

In the example illustrated, the sheet 2 is based on fibers, for example cellulose fibers, and may also contain, optionally, synthetic or artificial fibers. As a variant, the sheet 2 may be based essentially on a material other than a fibrous material.

In the example shown in FIG. 1, the depth of the cavity 3 is greater than the thickness of the chip 4 so that the article 1 has no additional thickness at the point in line with the chip 4.

As a variant, the depth of the cavity 3 is less than the thickness of the chip 4, so as to create a relief on the surface of the article 1, as may be seen in FIG. 2. This relief may be detected by feel, so as to allow an unsighted person to recognize the article 1.

The chip 4 may be of the passive type, allowing contactless data transmission, and may be connected to an antenna 7 comprising at least one turn. This antenna may be produced, for example, directly on the film 5, around the chip 4, allowing detection in the vicinity or neighborhood, for example detection with a range of between 1 and 70 cm.

As a variant, the antenna may be produced on the chip itself, when short-range detection is sufficient, for example with a range of greater than 1 mm but less than about 1 cm.

The chip 4 is, for example, based on silicon and may have a thickness of about 200 µm for example.

The cavity 3 may receive an element other than an electronic chip 4.

FIG. 3 shows an article 1' that differs from the article 1 described above in the fact that the cavity 3 receives particles 6. These may, for example, be magnetic or non-magnetic, metallic or plastic.

In the example illustrated, the particles 6 are in an amount sufficient to create on the surface of the article 1' a relief detectable by feel.

The structure 5 may have locally, in line with the cavity 3, a softness or hardness detectable by feel, thus allowing an unsighted person to recognize the article.

The element placed in the cavity 3 may also consist of an object of predetermined shape, merely having the function of creating a relief that can be detected by feel.

The structure may, for example, consist of a single polyester film, as illustrated above. It would not be outside the scope of the present invention to use a different structure, especially a multilayer structure.

As an example, FIG. 4 shows a composite structure 5' comprising:

a carrier layer 10 made of polyester;
a release layer 11, for example made of wax;
a layer of varnish 12 containing a resin and optionally a dye;
a metal layer 13, for example made of aluminum;
an adhesive layer 14 for fastening the element 4 to the fibrous layer 2. The adhesive layer 14 may be based on a hot-melt resin.

In the example described, the carrier layer 10 has a thickness of about 12 µm and the combined thickness of the layers 11 to 14 is about 2 to 3 µm.

The layers 12, 13 and 14 form a film 5" to be transferred to the sheet 2.

The structure 5' is also called a foil and it allows the film 5" to be joined to the sheet 2, for example by hot pressing, during which operation the release layer 11 melts and allows the carrier layer 10 to be separated from the other layers. The heat provided during this operation also activates the adhesive layer 14, so as to thermally bond the film 5" to the sheet 2.

The metal layer 13, for example made of aluminum, may have a surface appearance allowing light to be reflected through the layer of colored varnish 12, thus creating a color effect on the surface of the article.

The layer 12 may have a hologram formed by a diffraction grating. The latter may be produced by means of a die of a transfer machine for transferring the film 5" to the sheet 2. As a variant, the hologram may be produced before the layer 12 is joined to the other layers.

The metal layer 13 may be replaced with a plastic layer.

The film 5 or 5" may or may not entirely cover one side of the article.

The film 5 or 5" may extend with or without a break between two opposed edges of the article.

The film 5 or 5" may form a patch on the article.

To illustrate a number of these options, a few examples of articles that can be obtained by implementing the invention will now be described.

FIG. 5 shows a bank note 20 comprising a film 5 or 5" and a sheet 2.

The film 5 or 5" in this example consists of a band extending between two opposed edges of the banknote 20. A number of individual reflecting surfaces 21, each having the shape of a parallelogram, are produced on the visible side of this band 5 or 5".

As disclosed in European patent EP 0 522 217, these reflecting surfaces 21 may be produced by transferring a continuous reflecting thin film 5 or 5" onto the sheet 2, and then by printing opaque areas 22 on this film. This printing may be carried out, for example, by means of an ink. The opaque areas 22 may as a variant be obtained by locally dissolving the film 5 or 5". The banknote 20 may have one or more elements housed in cavities beneath the film 5 or 5".

FIGS. 6 and 7 show two gift vouchers 25 and 25' that include a sheet on which a bar code 26 has been printed.

The voucher 25 includes a film 27 that is small compared with the sheet, this film 27 having a structure allowing a holographic image 28 to be created. This film 27 covers a cavity of the fibrous layer housing an electronic chip (not shown). The film 27 constitutes a patch.

The voucher 25' has a film 30, for example a transparent film, entirely covering the underlying sheet. The chip 29 is housed in a cavity of the fibrous layer and may be seen through the film 30 when the latter is transparent.

The cavity receiving the element may be produced in many ways.

As an example of one possible way among others of producing a cavity, a process for producing a sheet comprising at least one cavity open on one side will now describe with reference to FIG. 8.

This figure shows, partially and schematically, two paper machines 35 and 36 called cylinder mold machines.

Figure 9:
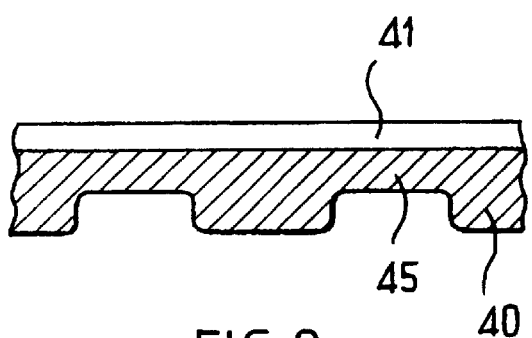
FIGS. 9 and 10 show partially and schematically, in cross section, two embodiments of a sheet that can be obtained with the plant of FIG. 8.
Figure 10:
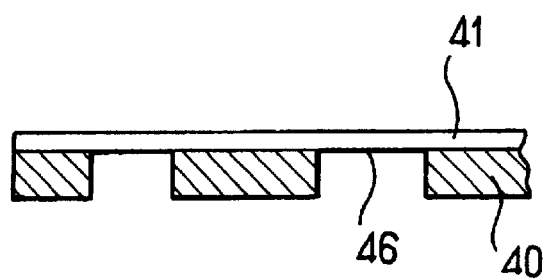

The first machine 35 has a tank 37 containing a suspension of fibers, for example cellulose fibers, in which suspension is partly immersed a rotating wire cylinder 38 defining a surface 39 in contact with which a ply of paper 40 is continuously formed and taken up by a take-up felt 42. The surface 39 is embossed so as to create, in the first ply 40, areas of reduced thickness 45, as illustrated in FIG. 9, or holes 46, as illustrated in FIG. 10, these areas being intended to form cavities in the sheet.

The second machine 36 has, like the machine 35, a tank 37 and a rotating wire cylinder 44 defining a surface 47 in contact with which a second ply of paper 41 is formed. The plies of paper 40 and 41 are joined together, for example by passing them between the cylinder mold 44 and a rotating roll 48.

An example of such a plant is described in European patent EP 0 687 324.

Thereafter, the sheet may be cut to the dimensions of the article to be produced.

The cavity may be produced by yet other means, for example using a laser or by mechanical abrasion.

The structure and the sheet may be joined together in many ways without departing from the scope of the invention.

For example, the structure and the sheet may be joined together by lamination, as illustrated in FIG. 11, by passing them between two rotating rolls 50 and 51. In this figure, the film 5 is brought beforehand into contact with a size applicator 53. The film 5 and the sheet 2 may then be positioned one with respect to the other by registration, so that an element carried by the film 5 is housed in a cavity of the sheet. In the example in question, the film 5 remains in place on the sheet 2.

Figure 13:
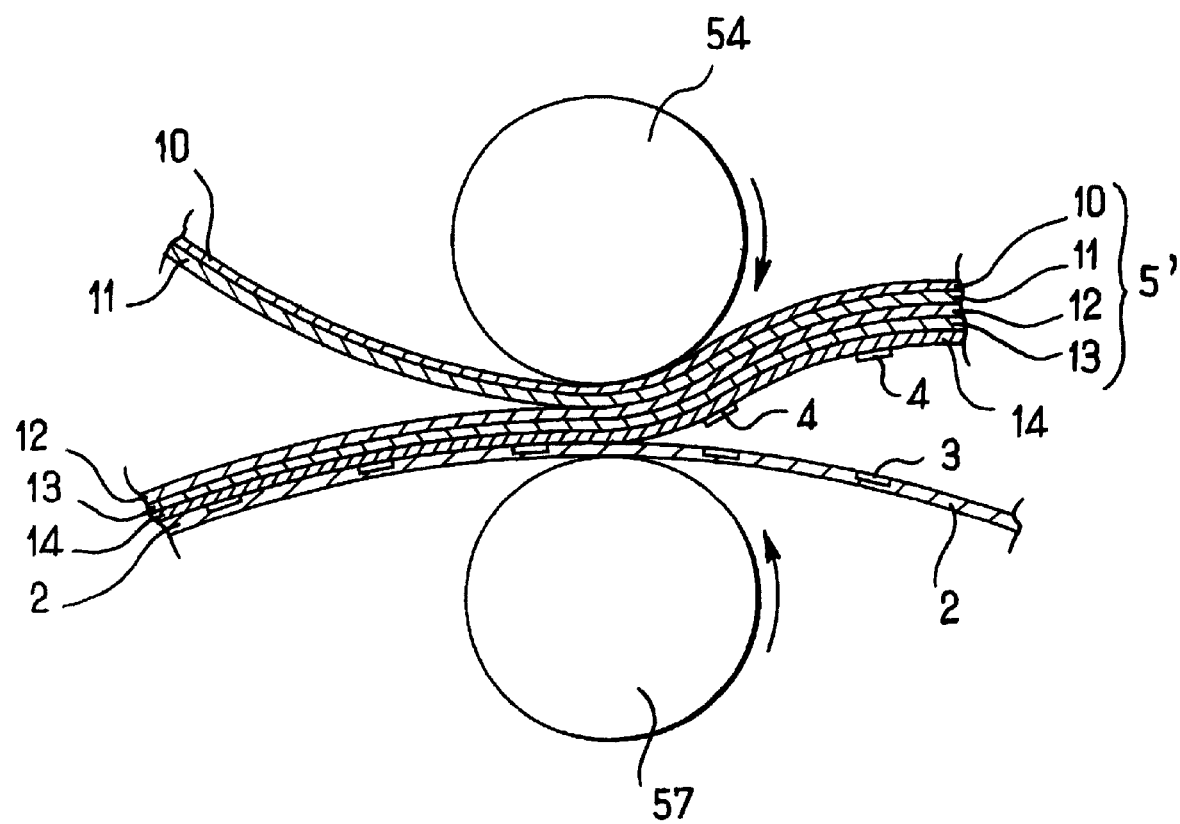
FIG. 13 shows schematically and partially a detail of FIG. 12.

In the case of the composite structure 5', the film 12, 13, 14 may be transferred, for example hot, to the sheet 2, as illustrated in FIGS. 12 and 13. In such a transfer process, the sheet 2 and the structure 5' may be entrained with the carrier layer 10, 11 by moving them in the same direction by means of a machine comprising a first rotating roll 55 carrying dies 56 and a second rotating roll 57. The film 12, 13, 14 and the sheet 2 may be joined together by passing them between the rolls 55 and 57. It may be seen in FIG. 13 that, after passing between the rotating rolls 54 and 57, the carrier layer 10 and the release layer 11 are separated from the other layers 12, 13 and 14, transferred to the sheet 2.

The hot-transfer machine shown in FIGS. 12 and 13 may, without restriction, operate according to the principles of the "Foil-Jet" machine sold by Steuer GmbH and described, for example, in patent application DE-19625064.

The film 12, 13, 14 may also be taken between a die 56 and the sheet 2 in a direction generally transverse to the movement of the sheet, as described in European patent EP 0 473 635.

Of course, the invention is not limited to the embodiments that have just been described.

The cavity or cavities in the sheet may or may not be through-cavities. Each cavity may be closed on one side only by a film, or on both sides by two films. Each through-cavity may also be closed on one side by a film and on the other side by a fibrous layer. Especially when the element is placed in the cavity of the film by transfer, the layer of the structure carrying the element may be based on a fibrous material.

The invention claimed is:

1. A process for manufacturing an article comprising a sheet and at least one element having a certain thickness, comprising the following steps:
   providing a sheet with at least one cavity open on one side;
   placing said element in this cavity by applying, to said side, a structure comprising at least one layer carrying the element, said structure being positioned with respect to the sheet so that the element is at least partly housed in the cavity,
   wherein the sheet and the element are joined together by transfer by removing one or more layers of the structure.

2. The process as claimed in claim 1, wherein the layer of the structure carrying the element is made of plastic.

3. The process as claimed in claim 1, wherein the layer of the structure carrying the element is made of metal.

4. The process as claimed in claim 1, wherein the layer of the structure carrying the element is based on a fibrous material.

5. The process as claimed in claim 1, wherein the layer of the structure carrying the element comes from the application of a film-forming composition, especially a magnetic or iridescent film-forming composition.

6. The process as claimed in claim 1, wherein the depth of the cavity is greater than or equal to that of the element.

7. The process as claimed in claim 1, wherein the structure covers all of one side of the sheet.

8. The process as claimed in claim 1, wherein the structure covers only part of one side of the sheet.

9. The process as claimed in claim 8, wherein the structure defines a band.

10. The process as claimed in claim 1, wherein the article has no additional thickness at the point where the element is.

11. The process as claimed in claim 1, wherein the article includes, in line with the element, a relief that can be detected by feel.

12. The process as claimed in claim 1, wherein the article includes an area having a hardness or softness that can be detected by feel.

13. The process as claimed in claim 1, wherein the cavity is a through-cavity.

14. The process as claimed in claim 1, wherein the cavity is a non-through-cavity.

15. The process as claimed in claim 1, wherein the structure includes at least one of the following elements: a holographic and/or diffractive element, a magnetic, metallic or crystalline coating, liquid crystals, a varnish or ink printing element, iridescent pigments, thermochromic and/or piezochromic pigments, at least one reflecting surface.

16. The process as claimed in claim 1, wherein the structure includes a plastic film, especially a polyester film.

17. The process as claimed in claim 1, wherein the layer carrying the element is the only layer of the structure.

18. The process as claimed in claim 1, wherein the layer carrying the element is fastened to a carrier layer, before the element is transferred to the sheet.

19. The process as claimed in claim 1, wherein the layer carrying the element includes a plurality of film or fibrous portions placed so that, after their transfer to the sheet, these portions are spaced apart on the surface of the sheet.

20. The process as claimed in claim 1, wherein the sheet is brought into contact with a structure initially comprising at least the following layers:
   a carrier layer;
   a release layer;

a layer of metal, plastic or fibrous material, or a layer deriving from the application of a film-forming composition, especially a magnetic or iridescent film-forming composition; and an adhesive layer.

21. The process as claimed in claim 1, wherein said element includes an electronic chip allowing contactless data transmission.

22. The process as claimed in claim 1, wherein said element includes magnetic or nonmagnetic, metallic or plastic particles, or crystals or biomarkers.

23. The process as claimed in claim 1, wherein the sheet includes at least one fibrous layer.

24. The process as claimed in claim 23, wherein the cavity is produced during formation of the sheet on a paper machine.

25. The process as claimed in claim 24, wherein the sheet is produced in the following manner:

a first ply of paper is formed on contact with a surface immersed in a dispersion of fibrous material, this first ply having an area of reduced thickness, or even a hole, intended to define said cavity;

the first ply of paper is joined to a second ply of paper.

26. An article comprising a sheet with at least one fibrous layer, having at least one cavity at least partly housing an element of a certain thickness, this cavity being covered by a structure comprising at least one layer of plastic, metal or fibrous material, or by a layer deriving from the application of a film-forming composition, wherein the at least one layer of the structure includes a plurality of film or fibrous portions spaced apart on the surface of the sheet.

27. The process as claimed in claim 20 wherein the structure initially comprises a layer of varnish containing a resin.

28. The process as claimed in claim 27, wherein the layer of varnish contains a dye.

29. The process as claimed in claim 1, wherein the layer carrying the element is joined to the sheet by transfer and a carrier layer is removed.

30. The process as claimed in claim 1, wherein the element is fastened to the layer carrying the element through an adhesive layer.

31. The process as claimed in claim 30, wherein the layer carrying the element comprises a fibrous material.

32. The process as claimed in claim 1, wherein the sheet comprises at least two cavities and the two cavities receive (i) elements that are different from each other, or (ii) elements having functions that complement each other.

33. The process as claimed in claim 1, wherein only the element and an adhesive layer are transferred to the sheet.

34. The process as claimed in claim 1, wherein the at least one layer carrying the element is transferred to the sheet.

35. The article as claimed in claim 26, wherein the element is disposed on and fastened to a main surface of the layer of the structure.

36. The article as claimed in claim 35, wherein the element is fastened to the layer of the structure through an adhesive layer.

37. The article as claimed in claim 26, wherein the layer carrying the element comprises a fibrous material.

38. The article as claimed in claim 26, wherein the sheet comprises at least two cavities and the two cavities receive (i) elements that are different from each other, or (ii) elements having functions that complement each other.

39. The article as claimed in claim 26, wherein the cavity is covered by a layer deriving from the application of a film-forming composition.

40. The article as claimed in claim 39, wherein the film-forming composition is a magnetic or iridescent film-forming composition.

* * * * *